US010436809B2

(12) United States Patent
Ito et al.

(10) Patent No.: US 10,436,809 B2
(45) Date of Patent: Oct. 8, 2019

(54) RADIAL-TYPE MAGNETIC ENCODER, BEARING DEVICE PROVIDED WITH RADIAL-TYPE MAGNETIC ENCODER, AND METHOD FOR MANUFACTURING RADIAL-TYPE MAGNETIC ENCODER

(71) Applicant: NAKANISHI METAL WORKS CO., LTD., Osaka (JP)

(72) Inventors: Yoshihiro Ito, Osaka (JP); Yutaka Jogan, Osaka (JP)

(73) Assignee: NAKANISHI METAL WORKS CO., LTD., Osaka-shi (JP)

(*) Notice: Subject to any disclaimer, the term of this patent is extended or adjusted under 35 U.S.C. 154(b) by 0 days.

(21) Appl. No.: 16/097,396

(22) PCT Filed: Mar. 21, 2017

(86) PCT No.: PCT/JP2017/011107
§ 371 (c)(1),
(2) Date: Oct. 29, 2018

(87) PCT Pub. No.: WO2017/195465
PCT Pub. Date: Nov. 16, 2017

(65) Prior Publication Data
US 2019/0145999 A1 May 16, 2019

(30) Foreign Application Priority Data
May 9, 2016 (JP) .................................. 2016-093635

(51) Int. Cl.
F16C 41/00 (2006.01)
G01P 3/487 (2006.01)
(Continued)

(52) U.S. Cl.
CPC ................. *G01P 3/487* (2013.01); *B21J 5/02* (2013.01); *B29C 45/14* (2013.01); *G01D 5/245* (2013.01);
(Continued)

(58) Field of Classification Search
CPC .......................... F16C 41/007; F16C 2233/00
See application file for complete search history.

(56) References Cited

U.S. PATENT DOCUMENTS 5,090,236 A * 2/1992 Vignotto ................. G01P 3/443
384/448
6,870,363 B2 * 3/2005 Krabill .................... G01P 3/443
324/166
(Continued)

FOREIGN PATENT DOCUMENTS

JP 2008-215921 A 9/2008
JP 5131060 B2 1/2013

OTHER PUBLICATIONS

International Search Report for International Application No. PCT/JP2017/011107 dated Jun. 13, 2017 (2 Sheets).

*Primary Examiner* — Thomas R Hannon
(74) *Attorney, Agent, or Firm* — Kratz, Quintos & Hanson, LLP

(57) ABSTRACT

A radial-type magnetic encoder includes: an annular fixing member; and an annular plastic magnet attached to the annular fixing member. The annular fixing member includes the cylindrical portion, an outward flange portion extending outward in a radial direction from an edge of the cylindrical portion, and a sensor opposed portion bent from an edge of the outward flange portion and opposed to a magnetic sensor which detects rotation of the magnetic encoder, and the annular fixing member has a substantially U-shaped sectional shape along a plane including the radial direction and an axial direction. The annular plastic magnet has a shape (Continued)

US 10,436,809 B2
Page 2 that covers a front surface, a back surface, and an end edge of the sensor opposed portion, and an outer-diameter-side part of the outward flange portion.

3 Claims, 6 Drawing Sheets

(51) Int. Cl.
    *G01D 5/245*     (2006.01)
    *B21J 5/02*     (2006.01)
    *B29C 45/14*     (2006.01)
    *B29L 31/04*     (2006.01)
    *F16C 19/38*     (2006.01)

(52) U.S. Cl.
    CPC ... *B29K 2995/0008* (2013.01); *B29L 2031/04* (2013.01); *F16C 19/38* (2013.01); *F16C 2233/00* (2013.01)

(56) References Cited

U.S. PATENT DOCUMENTS

| | | | | |
|---|---|---|---|---|
| 7,425,295 | B2* | 9/2008 | Mizuta | B60T 8/329 |
| | | | | 264/427 |
| 8,950,944 | B2* | 2/2015 | Niarfeix | F16C 41/007 |
| | | | | 324/173 |
| 2007/0025654 | A1* | 2/2007 | Shige | B60B 27/00 |
| | | | | 384/448 |
| 2008/0218161 | A1 | 9/2008 | Ishii | |
| 2008/0254901 | A1 | 10/2008 | Feng | |
| 2010/0135605 | A1* | 6/2010 | Ishii | B60B 27/0005 |
| | | | | 384/448 |

* cited by examiner

RADIAL-TYPE MAGNETIC ENCODER, BEARING DEVICE PROVIDED WITH RADIAL-TYPE MAGNETIC ENCODER, AND METHOD FOR MANUFACTURING RADIAL-TYPE MAGNETIC ENCODER

TECHNICAL FIELD

The present invention relates to a radial-type magnetic encoder used for detecting the rotation speed (number of revolutions) of a rotary body.

BACKGROUND ART

A magnetic encoder device used for detecting the rotation speed (number of revolutions) of a rotary body is used for various purposes, and is composed of: a magnetic encoder including an annular fixing member for attachment to the rotary body, and an annular magnet member fixed to the annular fixing member and magnetized in a multipole form so as to have N poles and S poles at regular intervals in the circumferential direction; and a magnetic sensor which is attached to a non-rotary body so as to be opposed to the magnet member and which detects rotation of the magnet member.

Among such magnetic encoders, one of radial-type magnetic encoders for detecting the rotation speed (number of revolutions) of a rotary body in the radial direction is configured such that, for the purpose of cost reduction and the like, the magnet member is formed from a plastic magnet, the outer circumference of the fixing member (core) is formed to have an inclined surface, and the inner circumference of the plastic magnet (resin pulsar) is formed to have an inclined surface corresponding to the inclined surface of the fixing member (see, for example, Patent Literature 1).

In the radial-type magnetic encoder of Patent Literature 1, with an adhesive agent applied to both or one of the outer circumferential surface of the annular fixing member (core) and the inner circumferential surface of the annular plastic magnet (resin pulsar), the fixing member and the plastic magnet are moved relative to each other in the axial direction so as to be fitted to each other such that their inclined surfaces come into contact with each other, whereby they are integrated.

CITATION LIST

Patent Literature

[PTL 1] Japanese Patent No. 5131060

SUMMARY OF THE INVENTION

Problems to be Solved by the Invention

Manufacturing the radial-type magnetic encoder as described in Patent Literature 1 requires the following steps: a fixing member manufacturing step of manufacturing the annular fixing member (core); a plastic magnet manufacturing step of manufacturing the annular plastic magnet (resin pulsar); an adhesive agent applying step of applying an adhesive agent to both or one of the outer circumferential surface of the fixing member and the inner circumferential surface of the plastic magnet; and a fitting step of moving the fixing member and the plastic magnet relative to each other in the axial direction so as to be fitted to each other such that their inclined surfaces come into contact with each other. Thus, since the number of steps is large, the manufacturing cost increases.

In addition, depending on variation in dimension accuracy of the annular fixing member and the annular plastic magnet which are separately manufactured, the condition when the fitting step is performed, and the like, the plastic magnet might be broken in the fitting step or magnetic accuracy might be decreased due to attachment error of the plastic magnet to the fixing member, whereby the yield is deteriorated.

In view of the above circumstances, an object to be achieved by the present invention is to provide a radial-type magnetic encoder that enables reduction in manufacturing cost and enhancement in yield.

Solution to the Problems

To achieve the above object, a radial-type magnetic encoder according to the present invention includes: an annular fixing member including a cylindrical portion to be attached to a rotary body; and an annular plastic magnet attached to the annular fixing member and magnetized in a multipole form so as to have N poles and S poles at regular intervals in a circumferential direction, wherein the annular fixing member includes the cylindrical portion, an outward flange portion extending outward in a radial direction from an edge of the cylindrical portion, and a sensor opposed portion bent from an edge of the outward flange portion and opposed to a magnetic sensor which detects rotation of the magnetic encoder, and the annular fixing member has a substantially U-shaped sectional shape along a plane including the radial direction and an axial direction, and the annular plastic magnet has a shape that covers a front surface, a back surface, and an end edge of the sensor opposed portion, and an outer-diameter-side part of the outward flange portion.

In the above configuration, the annular fixing member has a substantially U-shaped sectional shape, and even in a state in which the cylindrical portion is fitted to the rotary body, the sensor opposed portion connected to the cylindrical portion via the outward flange portion is separated outward in the radial direction from the cylindrical portion.

Thus, the front surface, the back surface, and the end edge of the sensor opposed portion, and the outer-diameter-side part (part including a corner portion and an end side portion bending from the outward flange portion to the sensor opposed portion) of the outward flange portion can be covered by the annular plastic magnet.

Since the annular plastic magnet is formed in a shape that covers the front surface, the back surface, and the end edge of the sensor opposed portion of the annular fixing member and the outer-diameter-side part of the outward flange portion of the annular fixing member, the annular plastic magnet is strongly joined to the annular fixing member without bonding the annular plastic magnet to the annular fixing member.

Therefore, if a part of the annular plastic magnet is chipped, the annular plastic magnet does not come off the annular fixing member, and thus the radial-type magnetic encoder having high reliability can be obtained.

In addition, the annular plastic magnet having the above shape is molded using an annular fixing member as an insert object by injection molding. Therefore, as compared to the case where an annular plastic magnet manufactured separately is fitted and bonded to an annular fixing member as in Patent Literature 1, the number of steps can be decreased, whereby the manufacturing cost can be reduced.

Furthermore, since the annular plastic magnet having the above shape is molded using the annular fixing member as an insert object by injection molding, breakage in the fitting step as in the radial-type magnetic encoder of Patent Literature 1 does not occur and reduction in magnetic accuracy due to attachment error in the fitting step does not occur. Thus, the yield is improved.

In the case where the annular plastic magnet needs to be bonded to the annular fixing member in accordance with requirement specifications, a thermosetting resin adhesive agent may be applied to a surface, to be joined to the annular plastic magnet, of the annular fixing member which is an insert object.

Here, preferably, the front surface and the back surface of the sensor opposed portion of the annular fixing member are conical surfaces having diameters that reduce from the end edge toward the outward flange portion of the annular fixing member, and an outer circumferential surface of the annular plastic magnet, and an axial-direction part, of an inner circumferential surface of the annular plastic magnet, that is on a sensor opposed portion side with respect to the outward flange portion, are conical surfaces having the same inclination direction as the sensor opposed portion.

In the above configuration, the front surface and the back surface of the sensor opposed portion of the annular fixing member having a substantially U-shaped sectional shape are conical surfaces having diameters that reduce from the end edge toward the outward flange portion, and the outer circumferential surface of the annular plastic magnet, and the axial-direction part, of the inner circumferential surface of the annular plastic magnet, that is on the sensor opposed portion side with respect to the outward flange portion, are conical surfaces having the same inclination direction as the sensor opposed portion. Therefore, after the annular plastic is molded using the annular fixing member as the insert object by injection molding, the insert molded product can be easily extracted from the mold.

Therefore, the structure of the mold for injection molding is simplified, and the annular plastic magnet can be prevented from being broken when the insert molded product is extracted from the mold.

A bearing device provided with a radial-type magnetic encoder according to the present invention includes: a bearing including an inner ring having an inner ring raceway surface formed on an outer circumferential surface thereof, an outer ring having an outer ring raceway surface formed on an inner circumferential surface thereof, and a rolling element that rolls between the inner ring raceway surface and the outer ring raceway surface; the radial-type magnetic encoder which is fixed to the inner ring in a case where the bearing is an inner ring rotation type, or fixed to the outer ring in a case where the bearing is an outer ring rotation type; and a magnetic sensor opposed to a magnetic pole of the magnetic encoder and configured to detect rotation of the magnetic encoder.

To achieve the above object, a method for manufacturing a radial-type magnetic encoder according to the present invention is a method for manufacturing a radial-type magnetic encoder that includes an annular fixing member including a cylindrical portion to be attached to a rotary body, and an annular plastic magnet attached to the annular fixing member and magnetized in a multipole form so as to have N poles and S poles at regular intervals in a circumferential direction, the method including: a press working step of manufacturing the annular fixing member by press working, the annular fixing member including the cylindrical portion, an outward flange portion extending outward in a radial direction from an edge of the cylindrical portion, and a sensor opposed portion bent from an edge of the outward flange portion and opposed to a magnetic sensor which detects rotation of the magnetic encoder, the annular fixing member having a substantially U-shaped sectional shape along a plane including the radial direction and an axial direction; and an injection molding step of, in a state in which the annular fixing member is placed in a mold for injection molding, injecting a melted annular plastic magnet material into a cavity of the mold, to mold the annular plastic magnet having a shape that covers a front surface, a back surface, and an end edge of the sensor opposed portion, and an outer-diameter-side part of the outward flange portion.

In the above manufacturing method, the annular fixing member manufactured in the press working step has a substantially U-shaped sectional shape, and in a state in which the annular fixing member is placed as an insert object in the mold for injection molding, a melted annular plastic magnet material is injected into the cavity of the mold to mold the annular plastic magnet having the above shape. Therefore, as compared to the case where an annular plastic magnet manufactured separately is fitted and bonded to an annular fixing member as in Patent Literature 1, the number of steps can be decreased, whereby the manufacturing cost can be reduced.

In addition, since the annular plastic magnet having the above shape is molded using the annular fixing member as an insert object by the injection molding, breakage in the fitting step as in the radial-type magnetic encoder of Patent Literature 1 does not occur and reduction in magnetic accuracy due to attachment error in the fitting step does not occur. Thus, the yield is improved.

In the radial-type magnetic encoder manufactured by the above manufacturing method, the annular plastic magnet has a shape that covers the front surface, the back surface, and the end edge of the sensor opposed portion of the annular fixing member, and the outer-diameter-side part of the outward flange portion of the annular fixing member. Therefore, the annular plastic magnet is strongly joined to the annular fixing member without bonding the annular plastic magnet to the annular fixing member.

Therefore, even if a part of the annular plastic magnet is chipped, the annular plastic magnet does not come off the annular fixing member, and thus the radial-type magnetic encoder having high reliability can be obtained.

In the case where the annular plastic magnet needs to be bonded to the annular fixing member in accordance with requirement specifications, an adhesive agent applying step of applying a thermosetting resin adhesive agent to a surface, to be joined to the annular plastic magnet, of the annular fixing member which is an insert object, may be provided, and after the injection molding step, a thermosetting treatment step of performing a thermosetting treatment at a temperature equal to or higher than such a temperature that the thermosetting resin adhesive agent starts a crosslinking reaction, may be provided.

Here, preferably, the front surface and the back surface of the sensor opposed portion of the annular fixing member are conical surfaces having diameters that reduce from the end edge toward the outward flange portion of the annular fixing member, and an outer circumferential surface of the annular plastic magnet, and an axial-direction part, of an inner circumferential surface of the annular plastic magnet, that is on a sensor opposed portion side with respect to the outward flange portion, are conical surfaces having the same inclination direction as the sensor opposed portion.

In the above manufacturing method, the front surface and the back surface of the sensor opposed portion of the annular fixing member having a substantially U-shaped sectional shape are conical surfaces having diameters that reduce from the end edge toward the outward flange portion, and the outer circumferential surface of the annular plastic magnet, and the axial-direction part, of the inner circumferential surface of the annular plastic magnet, that is on the sensor opposed portion side with respect to the outward flange portion, are conical surfaces having the same inclination direction as the sensor opposed portion. Therefore, after the annular plastic is molded using the annular fixing member as the insert object in the injection molding step, the insert molded product can be easily extracted from the mold. Therefore, the structure of the mold for injection molding is simplified, and the annular plastic magnet can be prevented from being broken when the insert molded product is extracted from the mold.

In addition to the above feature, the front surface and the back surface of the sensor opposed portion of the annular fixing member are conical surfaces, and the outer circumferential surface of the annular plastic magnet, and the axial-direction part, of the inner circumferential surface of the annular plastic magnet, that is on the sensor opposed portion side with respect to the outward flange portion, are conical surfaces having the same inclination direction as the sensor opposed portion. Therefore, the thickness of the annular plastic magnet can be substantially uniformed. Thus, the melted annular plastic magnet material flows smoothly in the injection molding step, whereby the quality of the annular plastic magnet is improved.

Advantageous Effects of the Invention

The radial-type magnetic encoder according to the present invention as described above provides, mainly, the following effects.

(1) Since the annular plastic magnet has a shape that covers the front surface, the back surface, and the end edge of the sensor opposed portion of the annular fixing member and the outer-diameter-side part of the outward flange portion of the annular fixing member, the annular plastic magnet is strongly joined to the annular fixing member without bonding the annular plastic magnet to the annular fixing member. Therefore, the radial-type magnetic encoder having high reliability can be obtained.

(2) The annular plastic magnet having the above shape is molded using an annular fixing member as an insert object by injection molding. Therefore, as compared to the case where an annular plastic magnet manufactured separately is fitted and bonded to an annular fixing member as in Patent Literature 1, the number of steps can be decreased, whereby the manufacturing cost can be reduced.

(3) Since the annular plastic magnet having the above shape is molded using the annular fixing member as an insert object by injection molding, breakage in the fitting step as in the radial-type magnetic encoder of Patent Literature 1 does not occur and reduction in magnetic accuracy due to attachment error in the fitting step does not occur. Thus, the yield is improved.

DESCRIPTION OF EMBODIMENTS

Next, embodiments of the present invention will be described in detail with reference to the accompanying drawings. However, the present invention is not limited to embodiments shown in the accompanying drawings, but includes all the embodiments that satisfy requirements described in claims.

As used herein, the direction of a rotary shaft of a rotary body is referred to as "axial direction", and a "radial direction" and a "circumferential direction" are defined, using the axis of the rotary shaft as a reference.

Figure 1:
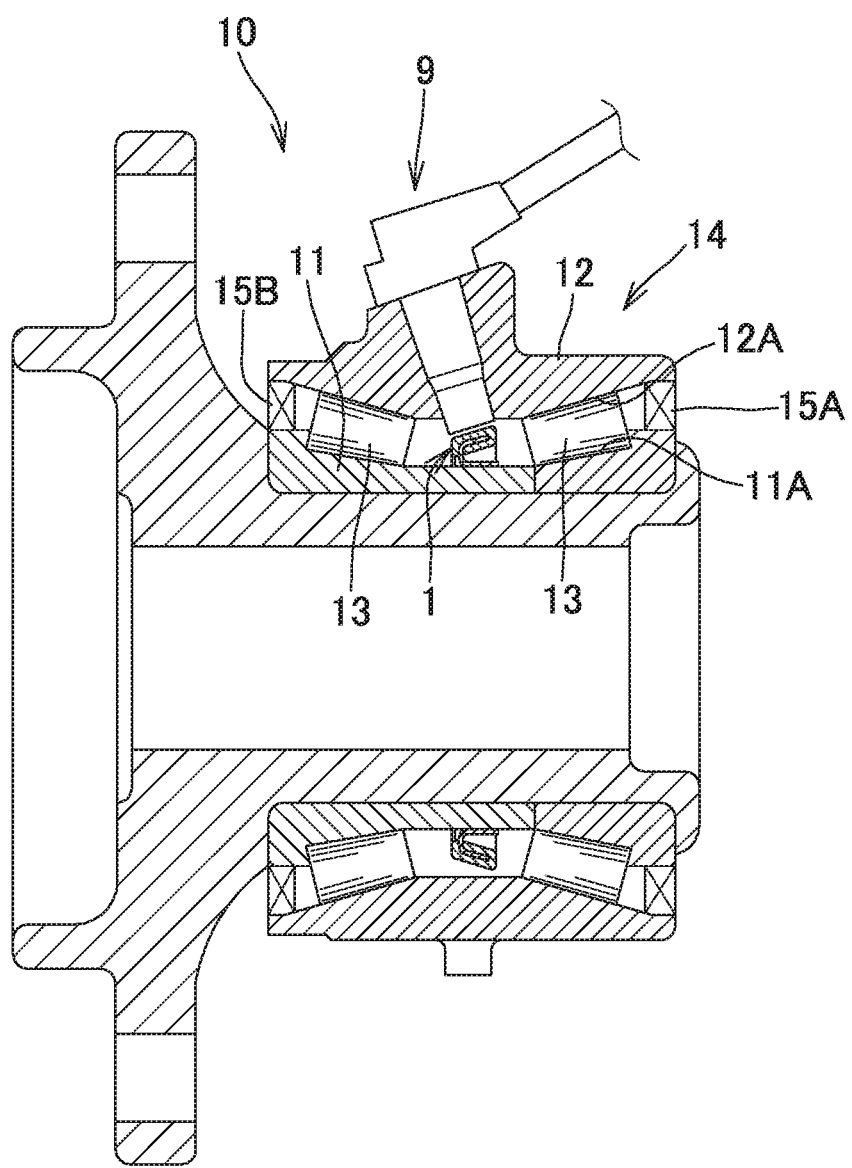
FIG. 1 is a vertical sectional view showing an example of a bearing device provided with a radial-type magnetic encoder according to an embodiment of the present invention.

A bearing 14 of a bearing device 10 provided with a radial-type magnetic encoder 1 according to an embodiment of the present invention shown in a vertical sectional view in FIG. 1 is a hub unit in which tapered rollers having a great load capacity are arranged in double rows as rolling elements 13, and is an inner ring rotation type in which an inner ring 11 rotates.

The bearing 14 includes: the inner ring 11 having an inner ring raceway surface 11A formed on the outer circumferential surface thereof; an outer ring 12 having an outer ring raceway surface 12A formed on the inner circumferential surface thereof; the rolling elements 13, 13, . . . , which roll between the inner ring raceway surface 11A and the outer ring raceway surface 12A; and seal members 15A, 15B arranged outward in the axial direction with respect to the rolling elements 13, 13 on the front and rear sides in the axial direction.

The bearing device 10 includes: the bearing 14; the radial-type magnetic encoder 1 fixed to the inner ring 11 which is the rotary body; and a magnetic sensor 9 which is opposed to a magnetic pole of the magnetic encoder 1 and detects rotation of the magnetic encoder 1.

Figure 2:
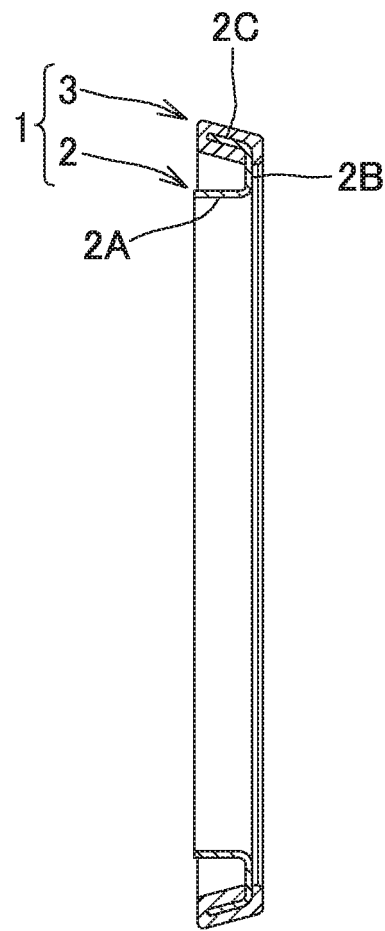
FIG. 2 is a vertical sectional view of the radial-type magnetic encoder according to the embodiment of the present invention.
Figure 3:
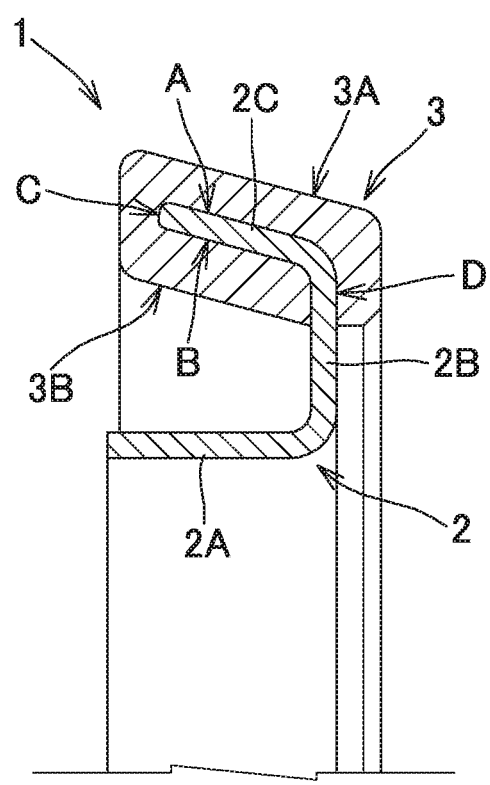
FIG. 3 is a major-part enlarged vertical sectional view of the same.

As shown in the vertical sectional view in FIG. 1, a vertical sectional view in FIG. 2, and a major-part enlarged vertical sectional view in FIG. 3, the radial-type magnetic encoder 1 according to the embodiment of the present invention is composed of: an annular fixing member 2 including a cylindrical portion 2A to be attached to the inner ring 11 which is the rotary body; and an annular plastic magnet 3 attached to the annular fixing member 2 and magnetized in a multipole form so as to have N poles and S poles at regular intervals in the circumferential direction.

The annular fixing member 2 includes: the cylindrical portion 2A; an outward flange portion 2B extending outward in the radial direction from the edge of the cylindrical portion 2A; and a sensor opposed portion 2C bending from the edge of the outward flange portion 2B and opposed to the magnetic sensor 9 which detects rotation of the magnetic encoder 1. The annular fixing member 2 has a substantially U-shaped sectional shape (sectional shape in FIG. 1 to FIG. 3) along a plane including the radial direction and the axial direction.

The annular plastic magnet 3 has a shape that covers a front surface A, a back surface B, and an end edge C of the sensor opposed portion 2C of the annular fixing member 2, and an outer-diameter-side part D (part including a corner portion and an end side portion bending from the outward flange portion 2B to the sensor opposed portion 2C) of the outward flange portion 2B of the annular fixing member 2.

Here, the front surface A and the back surface B of the sensor opposed portion 2C of the annular fixing member 2 are conical surfaces having diameters that reduce from the end edge C toward the outward flange portion 2B of the annular fixing member 2.

The outer circumferential surface 3A of the annular plastic magnet 3 is a conical surface having the same inclination direction as the sensor opposed portion 2C.

An axial-direction part, of the inner circumferential surface 3B of the annular plastic magnet 3, that is on the sensor opposed portion 2C side with respect to the outward flange portion 2B is a conical surface having the same inclination direction as the sensor opposed portion 2C.

Next, a method for manufacturing the radial-type magnetic encoder 1 according to the embodiment of the present invention will be described.

<Press Working Step>

The annular fixing member 2 having the above shape shown in FIG. 2 and FIG. 3 is manufactured from a metal plate by sheet metal press working.

For example, a disk-shaped blank of a metal sheet is subjected to outer-diameter drawing, inner-diameter stamping, and burring, to form the annular fixing member 2. Alternatively, a ring-shaped blank of a metal sheet is subjected to drawing for inner diameter and outer diameter at the same time, to form the annular fixing member 2.

Here, as a material for the annular fixing member 2, a magnetic metal material is used so that the magnetic property of the annular plastic magnet 3 does not reduce. As a material for the annular fixing member 2, for example, a ferritic stainless steel sheet such as SUS430 may be used, and if formability in press working is also taken into consideration, it is desirable to use a cold rolled steel sheet such as SPCC which is low-carbon steel.

<Injection Molding Step>

Figure 4:
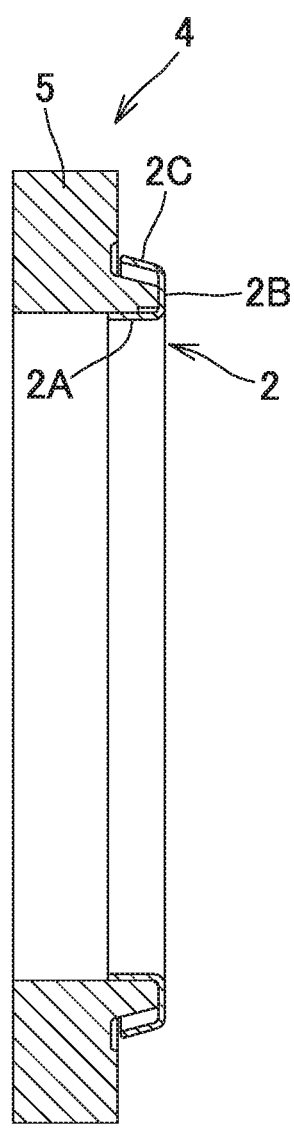
FIG. 4 is a vertical sectional view showing a state in which an annular fixing member which is an insert object is placed in a mold for injection molding.

As shown in a vertical sectional view in FIG. 4, in a state in which a mold 4 for injection molding is opened, the annular fixing member 2 which has been manufactured in the press working step and which is an insert object is placed in a movable-side mold 5 so that the cylindrical portion 2A is fitted to the movable-side mold 5.

Figure 5:
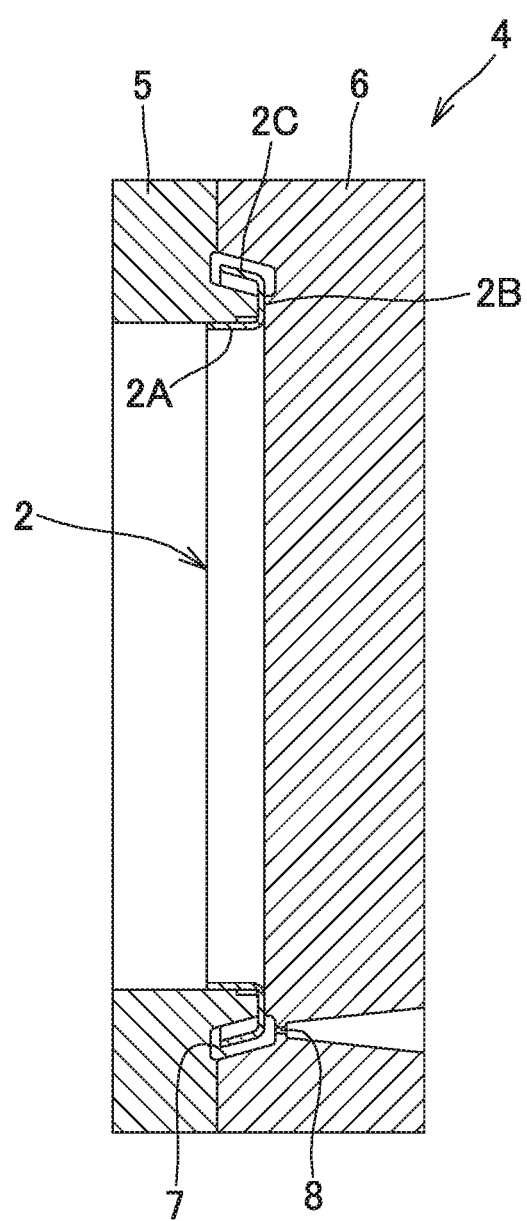
FIG. 5 is a vertical sectional view showing a state in which the mold for injection molding is closed.

As shown in the vertical sectional view in FIG. 5, in a mold-clamped state when the movable-side mold 5 is closed with respect to the fixed-side mold 6, the front and rear surfaces in the axial direction of an inner-diameter-side part of the outward flange portion 2B extending outward in the radial direction of the annular fixing member 2 are held between the movable-side mold 5 and the fixed-side mold 6, so that, of the outward flange portion 2B, a flat surface part (radially inner side part) in half or more of the radial-direction length thereof is held between the molds 5, 6.

As described above, regarding the annular fixing member 2, the cylindrical portion 2A is fitted to the movable-side mold 5, and the front and rear surfaces in the axial direction of the flat surface part in half or more of the radial-direction length of the outward flange portion 2B are held between the molds 5, 6, whereby a state in which the molds 5, 6 are in contact with the front and rear surfaces is kept. Therefore, the annular fixing member 2 is positioned accurately, stably, and reliably with respect to the molds 5, 6, and also in injection of a plastic magnet material, the annular fixing member 2 can be retained without being separated from the molds 5, 6 by the injection pressure.

Next, a melted material for the annular plastic magnet is injected through a gate 8 into a cavity 7 of the mold 4 for injection molding, thereby molding the annular plastic magnet 3 having the above shape shown in the vertical sectional view in FIG. 2.

Here, as a thermoplastic resin that is a material for the plastic magnet, for example, a thermoplastic resin such as polyamide (PA6, PA12, PA612, etc.) or polyphenylene sulfide (PPS) can be suitably used.

As magnetic powder that is a material for the plastic magnet, for example, ferritic magnetic powder of strontium ferrite, barium ferrite, or the like, or rare earth magnetic powder of neodymium-based material, samarium-based material, or the like, can be used.

Examples of an additive that is a material for the plastic magnet include organic additives such as a carbon fiber, inorganic additives such as glass beads, a glass fiber, talc, mica, silicon nitride (ceramic), and crystalline (or amorphous) silica, benzenesulfonic acid alkylamides, toluenesulfonic acid alkylamides, hydroxybenzoic acid alkyl esters, and the like. One of these materials may be used alone, or two or more of these materials may be used in combination.

Next, after the melted plastic magnet material is cooled and solidified, the movable-side mold 5 is opened from the parting line, and the magnetic encoder 1 molded in the shape shown in FIG. 2 is extracted.

Since the outer circumferential surface 3A of the annular plastic magnet 3 shown in FIG. 3 is a conical surface having the same inclination direction as the sensor opposed portion 2C of the annular fixing member 2 as described above, the fixed-side mold 6 and the annular plastic magnet 3 shown in FIG. 5 can be easily separated from each other.

In addition, the axial-direction part, of the inner circumferential surface 3B of the annular plastic magnet 3 shown in FIG. 3, that is on the sensor opposed portion 2C side with respect to the outward flange portion 2B is a conical shape having the same inclination direction as the sensor opposed portion B2C. Therefore, the movable-side mold 5 and the annular plastic magnet 3 shown in FIG. 5 can be easily separated from each other.

Thus, after the annular plastic magnet 3 is molded in the injection molding step, the radial-type magnetic encoder 1 which is an insert molded product can be easily extracted from the molds 5, 6. Therefore, the structure of the mold 4 for injection molding is simplified, and the annular plastic magnet 3 can be prevented from being broken when the radial-type magnetic encoder 1 is extracted from the molds 5, 6.

In addition to the above feature, as shown in FIG. 3, the front surface A and the back surface B of the sensor opposed portion 2C of the annular fixing member 2 are conical surfaces, and the outer circumferential surface 3A of the annular plastic magnet 3, and the axial-direction part, of the inner circumferential surface 3B of the annular plastic magnet 3, that is on the sensor opposed portion 2C side with respect to the outward flange portion 2B, are conical surfaces having the same inclination direction as the sensor opposed portion 2C. Therefore, the thickness of the annular plastic magnet 3 can be substantially uniformed. Thus, the melted annular plastic magnet material flows smoothly in the injection molding step, whereby the quality of the annular plastic magnet 3 is improved.

Regarding magnetization for the annular plastic magnet 3 of the radial-type magnetic encoder 1, for example, in the injection molding step, injection molding may be performed in an adjusted magnetic field, whereby the magnetic powder is subjected to magnetic field orientation. Alternatively, after the injection molding step, the magnetic encoder 1 may be demagnetized, and then using a magnetization device such as a magnetization yoke prepared separately, magnetization may be performed in a multipole form so as to have N poles and S poles alternately in the circumferential direction of the annular plastic magnet 3.

In the method for manufacturing the radial-type magnetic encoder 1 as described above, the annular fixing member 2 manufactured in the press working step has a substantially U-shaped sectional shape, and in a state in which the annular fixing member 2 is placed as an insert object in the mold 4 for injection molding, a melted annular plastic magnet material is injected into the cavity 7 of the mold 4 to mold the annular plastic magnet 3 having the above shape. Therefore, as compared to the case where an annular plastic magnet manufactured separately is fitted and bonded to an annular fixing member as in Patent Literature 1, the number of steps can be decreased, whereby the manufacturing cost can be reduced.

In addition, since the annular plastic magnet 3 having the above shape is molded using the annular fixing member 2 as an insert object in the injection molding step, breakage in the fitting step as in the radial-type magnetic encoder of Patent Literature 1 does not occur and reduction in magnetic accuracy due to attachment error in the fitting step does not occur. Thus, the yield is improved.

In the radial-type magnetic encoder 1 manufactured by the above manufacturing method, the annular plastic magnet 3 has a shape that covers the front surface A, the back surface B, and the end edge C of the sensor opposed portion 2C of the annular fixing member 2, and the outer-diameter-side part D of the outward flange portion 2B of the annular fixing member 2. Therefore, the annular plastic magnet 3 is strongly joined to the annular fixing member 2 without bonding the annular plastic magnet 3 to the annular fixing member 2.

Therefore, even if a part of the annular plastic magnet 3 is chipped, the annular plastic magnet 3 does not come off the annular fixing member 2, and thus the radial-type magnetic encoder 1 having high reliability can be obtained.

In the case where the annular plastic magnet 3 needs to be bonded to the annular fixing member 2 in accordance with requirement specifications, after the press working step, an adhesive agent applying step of applying a thermosetting resin adhesive agent to a surface, to be joined to the annular plastic magnet 3, of the annular fixing member 2 which is an insert object, may be provided.

In the above description, as shown in the vertical sectional view in FIG. 3, the front surface A and the back surface B of the sensor opposed portion 2C of the annular fixing member 2 are conical surfaces having diameters that reduce from the end edge C toward the outward flange portion 2B of the annular fixing member 2, and the outer circumferential surface 3A of the annular plastic magnet 3, and the axial-direction part, of the inner circumferential surface 3B of the annular plastic magnet 3, that is on the sensor opposed portion 2C side with respect to the outward flange portion 2B, are conical surfaces having the same inclination direction as the sensor opposed portion 2C.

Figure 6:
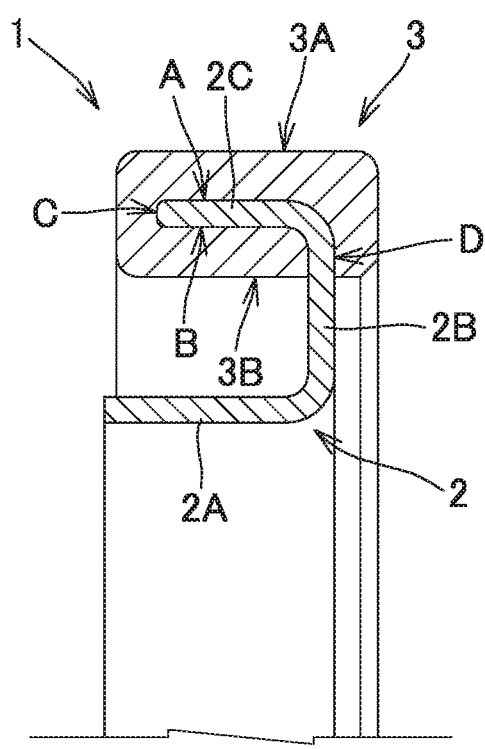
FIG. 6 is a vertical sectional view showing a modification of the radial-type magnetic encoder.

However, the present invention is not limited to the above configuration. For example, as shown in a vertical sectional view in FIG. 6, cylindrical surfaces may be employed instead of the conical surfaces. Even in the case of employing cylindrical surfaces instead of the conical surfaces, the outer circumferential surface 3A of the annular plastic magnet 3, and the axial-direction portion, of the inner circumferential surface 3B of the annular plastic magnet 3, that is on the sensor opposed portion 2C side with respect to the outward flange portion 2B, are designed to have draft angles.

In the above description, the radial-type magnetic encoder 1 of the present invention is provided to the inner-ring-rotation-type bearing 14 as shown in the vertical sectional view in FIG. 1. However, the radial-type magnetic encoder 1 of the present invention may be provided to an outer-ring-rotation-type bearing. In the case where the radial-type magnetic encoder 1 is provided to an outer-ring-rotation-type bearing, the cylindrical portion 2A of the annular fixing member 2 is attached to the outer ring which is the rotary body.

DESCRIPTION OF THE REFERENCE CHARACTERS 1 radial-type magnetic encoder
2 annular fixing member
2A cylindrical portion
2B outward flange portion
2C sensor opposed portion
3 annular plastic magnet
3A outer circumferential surface
3B inner circumferential surface
4 mold for injection molding
5 movable-side mold
6 fixed-side mold
7 cavity
8 gate
9 magnetic sensor
10 bearing device
11 inner ring (rotary body)
11A inner ring raceway surface
12 outer ring
12A outer ring raceway surface
13 rolling element
14 bearing
15A, 15B seal member
A front surface
B back surface
C end edge
D outer-diameter-side part of outward flange portion

The invention claimed is:

1. A radial-type magnetic encoder comprising:
an annular fixing member including a cylindrical portion to be attached to a rotary body; and
an annular plastic magnet attached to the annular fixing member and magnetized in a multipole form so as to have N poles and S poles at regular intervals in a circumferential direction, wherein
the annular fixing member includes the cylindrical portion, an outward flange portion extending outward in a radial direction from an edge of the cylindrical portion, and a sensor opposed portion bent from an edge of the outward flange portion and opposed to a magnetic sensor which detects rotation of the magnetic encoder, and the annular fixing member has a substantially U-shaped sectional shape along a plane including the radial direction and an axial direction,
the annular plastic magnet has a shape that covers a front surface, a back surface, and an end edge of the sensor opposed portion, and an outer-diameter-side part of the outward flange portion, the front surface and the back surface of the sensor opposed portion of the annular fixing member are conical surfaces having diameters that reduce from the end edge toward the outward flange portion of the annular fixing member, and an outer circumferential surface of the annular plastic magnet, and an axial-direction part, of an inner circumferential surface of the annular plastic magnet, that is on a sensor opposed portion side with respect to the outward flange portion, are conical surfaces having the same inclination direction as the sensor opposed portion.

2. A bearing device provided with a radial-type magnetic encoder, the bearing device comprising:

a bearing including an inner ring having an inner ring raceway surface formed on an outer circumferential surface thereof, an outer ring having an outer ring raceway surface formed on an inner circumferential surface thereof, and a rolling element that rolls between the inner ring raceway surface and the outer ring raceway surface;

the radial-type magnetic encoder according to claim 1, which is fixed to the inner ring in a case where the bearing is an inner ring rotation type, or fixed to the outer ring in a case where the bearing is an outer ring rotation type; and a magnetic sensor opposed to a magnetic pole of the magnetic encoder and configured to detect rotation of the magnetic encoder.

3. A method for manufacturing a radial-type magnetic encoder that includes an annular fixing member including a cylindrical portion to be attached to a rotary body, and an annular plastic magnet attached to the annular fixing member and magnetized in a multipole form so as to have N poles and S poles at regular intervals in a circumferential direction, the method comprising:

a press working step of manufacturing the annular fixing member by press working, the annular fixing member including the cylindrical portion, an outward flange portion extending outward in a radial direction from an edge of the cylindrical portion, and a sensor opposed portion bent from an edge of the outward flange portion and opposed to a magnetic sensor which detects rotation of the magnetic encoder, the annular fixing member having a substantially U-shaped sectional shape along a plane including the radial direction and an axial direction; and an injection molding step of, in a state in which the annular fixing member is placed in a mold for injection molding, injecting a melted annular plastic magnet material into a cavity of the mold, to mold the annular plastic magnet having a shape that covers a front surface, a back surface, and an end edge of the sensor opposed portion, and an outer-diameter-side part of the outward flange portion, wherein the front surface and the back surface of the sensor opposed portion of the annular fixing member are conical surfaces having diameters that reduce from the end edge toward the outward flange portion of the annular fixing member, and an outer circumferential surface of the annular plastic magnet, and an axial-direction part, of an inner circumferential surface of the annular plastic magnet, that is on a sensor opposed portion side with respect to the outward flange portion, are conical surfaces having the same inclination direction as the sensor opposed portion.

* * * * *